United States Patent
Bshara et al.

(10) Patent No.: US 10,268,612 B1
(45) Date of Patent: Apr. 23, 2019

(54) HARDWARE CONTROLLER SUPPORTING MEMORY PAGE MIGRATION

(71) Applicant: Amazon Technologies, Inc., Seattle, WA (US)

(72) Inventors: Nafea Bshara, San Jose, CA (US); Mark Bradley Davis, Austin, TX (US); Matthew Shawn Wilson, Bainbridge Island, WA (US); Uwe Dannowski, Moritzburg (DE); Yaniv Shapira, Bet Itzhak (IL); Adi Habusha, Moshav Alonei Abba (IL); Anthony Nicholas Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/275,168

(22) Filed: Sep. 23, 2016

(51) Int. Cl.
*G06F 13/30* (2006.01)
*G06F 13/40* (2006.01)
*G06F 3/06* (2006.01)
*G06F 12/0891* (2016.01)
*G06F 13/28* (2006.01)

(52) U.S. Cl.
CPC .............. *G06F 13/30* (2013.01); *G06F 3/061* (2013.01); *G06F 3/065* (2013.01); *G06F 3/0673* (2013.01); *G06F 12/0891* (2013.01); *G06F 13/28* (2013.01); *G06F 13/4068* (2013.01); *G06F 2212/60* (2013.01)

(58) Field of Classification Search
USPC ................................................ 710/22–29, 33
See application file for complete search history.

(56) References Cited

U.S. PATENT DOCUMENTS

| 6,804,729 B2* | 10/2004 | Swanberg | G06F 13/28 710/22 |
| 9,483,414 B2* | 11/2016 | Tsirkin | G06F 12/109 |
| 9,639,474 B2* | 5/2017 | Duluk, Jr. | G06F 12/1009 |
| 9,648,134 B2* | 5/2017 | Frank | H04L 67/34 |
| 2004/0010787 A1* | 1/2004 | Traut | G06F 9/45537 718/1 |
| 2004/0055004 A1* | 3/2004 | Sun | G06F 9/4862 718/108 |
| 2012/0023302 A1* | 1/2012 | Arndt | G06F 13/28 711/165 |
| 2012/0254546 A1* | 10/2012 | Montgomery | G06F 3/0617 711/130 |
| 2016/0132443 A1* | 5/2016 | Davda | G06F 13/28 710/308 |
| 2017/0139637 A1* | 5/2017 | Roozbeh | G06F 3/0647 |

* cited by examiner

*Primary Examiner* — Raymond N Phan
(74) *Attorney, Agent, or Firm* — Kilpatrick Townsend & Stockton LLP

(57) ABSTRACT

Disclosed herein are techniques for migrating data from a source memory range to a destination memory while data is being written into the source memory range. An apparatus includes a control logic configured to receive a request for data migration and initiate the data migration using a direct memory access (DMA) controller, while the source memory range continues to accept write operations. The apparatus also includes a tracking logic coupled to the control logic and configured to track write operations performed to the source memory range while data is being copied from the source memory range to the destination memory. The control logic is further configured to initiate copying data associated with the tracked write operations to the destination memory.

23 Claims, 9 Drawing Sheets

HARDWARE CONTROLLER SUPPORTING MEMORY PAGE MIGRATION

BACKGROUND

In a computing system, it may be desirable to move data in a memory page from a source physical memory to a destination physical memory for various reasons. To ensure the integrity of the data in the destination physical memory, that is, to ensure that data in the destination physical memory is identical to the data in the source physical memory, the operating system that manages the source physical memory or a virtual machine that uses the source physical memory may be suspended before the data is copied. The operating system or the virtual machine will resume only after the copying is complete and the associated page tables are updated. Thus, there may be significant downtime associated with moving data in a memory from the source physical memory to the destination physical memory.

BRIEF DESCRIPTION OF THE DRAWINGS

Various embodiments in accordance with the present disclosure will be described with reference to the drawings, in which.

DETAILED DESCRIPTION

Figure 1:
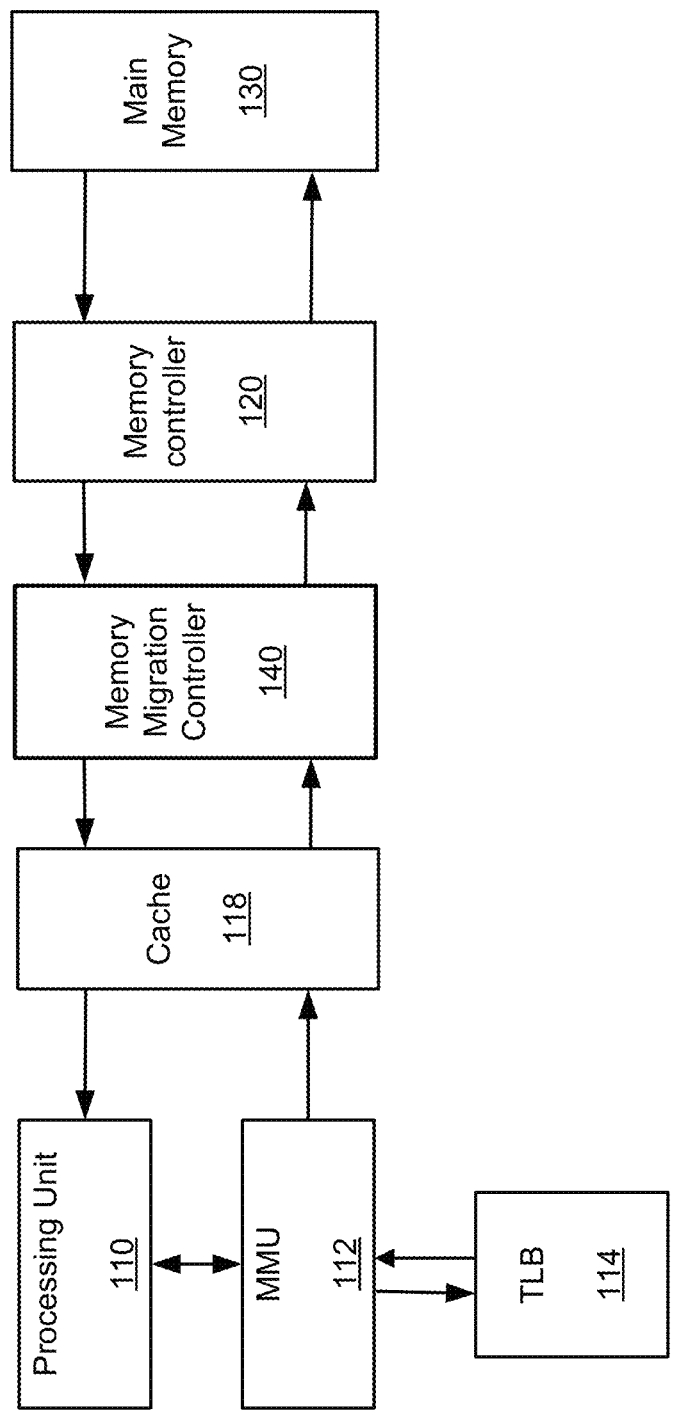
FIG. 1 is a simplified block diagram of an example computing system, according to some aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In a computing system, it may be desirable to move data in a memory page from a source physical memory to a destination physical memory for various reasons. This may often be referred to as memory page migration, data migration, or memory migration. For example, if certain data in a faster memory is not frequently used, it may be desirable to move the data from the faster memory to make space for other more frequently used data. As another example, in a cloud computing system using virtual machines and virtual memory, when a virtual machine is moved from a first processor to a second processor, it may be desirable to use a physical memory that is close to the second processor, even though the virtual memory address that the virtual machine sees may not change.

To ensure the integrity of the data in the destination physical memory, the operating system that manages the source physical memory or a virtual machine that uses the source physical memory may be suspended before the data is copied. The data may then be copied from the source physical memory to the destination physical memory. The operating system or the virtual machine may resume only after the copying is complete and the associated page table is updated. Thus, there may be significant downtime associated with data migration, during which the system may not respond to any external request or execute any user application.

Disclosed herein are techniques for migrating data from a source memory to a destination memory while the source memory continues to accept write operations, that is, while data is still being written into the source memory. More specifically, a memory migration controller may use a direct memory access (DMA) controller to copy data from a source memory to a destination memory. While data is being copied from the source memory to the destination memory by the DMA controller, the memory migration controller may track write operations to the source memory from, for example, a processor or a cache. Data associated with the tracked write operations, in particular, the write operations that were performed to a memory space of the source memory that had been copied by the DMA controller to the destination memory before the corresponding write operations, may be copied (or sometimes referred to as "reflected") to the destination memory by, for example, the DMA controller. In this way, the operating system or the virtual machine may continue to handle external requests while data is being copied from the source memory used by the operating system, the processor, or the virtual machine. After the copying is complete, the operating system or the virtual machine may be suspended such that the cache memory associated with the memory range of the source memory used by the operating system or the virtual machine may be flushed or invalidated, and the associated page table may be updated. As such, the operating system or the virtual machine may only be suspended when the cache is being flushed or invalidated and the page table is being updated, rather than being suspended when the data is being copied from the source memory to the destination memory. In various embodiments, the memory migration controller may be located anywhere on a path from a processing unit to a memory, such as integrated with the processing unit, in the memory controller of the memory, or between the processing unit and the memory as a stand-alone device.

As used herein, reflection of a write operation to a destination memory may refer to copying data associated with the write operation to the destination memory. "Suspend" and "pause" may be used interchangeably in this disclosure. An operating system, a virtual machine, and/or a process running on an operating system or a virtual machine may be suspended or paused temporarily (e.g., with states and data saved), and may resume later (e.g., with states and data restored) from the point where it is suspended or paused, without restarting the operating system, virtual machine, or process from the beginning.

FIG. 1 is a block diagram of an example computing system 100, according to some aspects of this disclosure. Computing system 100 may include a processing unit 110, a cache 118, a memory controller 120, and a main memory 130. Cache 118 may include, for example, a Level 1 instruction cache, a Level 1 data cache, a Level 2 cache, and a Level 3 cache. Main memory 130 may include a random-access memory (RAM), such as a dynamic random-access memory (DRAM), of various sizes. Main memory 130 may be coupled to a secondary memory (not shown) such as a hard disk, a flash memory, or an optical storage device. Memory controller 120 is a circuit that manages the flow of data going to and from main memory 130. Memory controller 120 may include a direct memory access (DMA) controller for allowing main memory 130 to be accessed independent of processing unit 110 such that processing unit 110 may be able to perform other functions while main memory 130 is being accessed by other hardware subsystems. The DMA controller can be a separate chip or integrated into another chip, such as being placed on the same die or as an integral part of memory controller 120. Cache 118 and main memory 130 may sometimes be collectively referred to as a physical memory. Even though not shown in FIG. 1, computing system 100 may include two or more instances of main memory 130 and the corresponding memory controllers.

Computing system 100 may be implemented in, for example, a computing node, a server, or a network device. Computing system 100 may be used as a virtual machine in, for example, a cloud computing environment. In a cloud computing environment, a virtual machine running on a physical processing device may use a virtual memory that is mapped to a physical memory. Virtual memory is a memory management technique that can be used for various reasons, including freeing user applications from having to manage a shared memory space, improving security and memory protection due to memory isolation, extending physical memory beyond the main memory, and providing a contiguous address space visible by a process. The operating system of a computing system manages virtual address spaces and the assignment of physical memory to virtual memory. In a computing system using virtual memory, memory addresses used by a program are usually virtual addresses. However, data and instructions are stored in a physical memory, such as a DRAM and caches, including a Level 1 instruction cache, a Level 1 data cache, a Level 2 cache, a Level 3 cache etc., using physical memory addresses. Thus, virtual memory addresses used by a program need to be translated into physical addresses for memory access.

A memory management unit (MMU) may be implemented in a processing unit to translate virtual addresses into physical addresses. The translations between virtual memory addresses and physical memory addresses are usually stored in a page table in the main memory due to the size of the page table. The page table may include one page table entry (PTE) for each page. Every time the processing unit accesses a memory, a virtual address is translated into a corresponding physical address. To avoid accessing the main memory every time a virtual address is mapped and thus speeding up the memory access, an MMU may store recent translation results into a translation lookaside buffer (TLB). A TLB may be implemented as a content-addressable memory (CAM), where the search key is the virtual page number and the search result is a physical page number. If the requested virtual page number is present in the TLB, a match may be found quickly and the retrieved physical page number can be used to access memory.

For example, computing system 100 shown in FIG. 1 may include an MMU 112 coupled to processing unit 110 or integrated into processing unit 110. MMU 112 may perform virtual memory management and virtual address translation, and handle memory protection, cache control, and bus arbitration. MMU 112 may be coupled to a TLB 114, which may be used to improve virtual address translation speed. TLB 114 may include a memory cache that stores recent translations of virtual addresses to physical addresses for faster retrieval of address translations. If a translation can be found in a TLB, a virtual memory access can execute just as fast as a direct physical memory access.

The need for memory page migration may arise from the desire to map a virtual memory page to different physical memory pages and move data in the physical memory pages among different memory entities in order to reach better locality for the memory pages that are in use by processes, or for other reasons. For example, if certain data in a faster memory is not frequently used, it may be desirable to move the data from the faster memory to make space for other more frequently used data. As another example, in a cloud computing environment using virtual machines and virtual memory, when a virtual machine is moved from a first processor to a second processor, it may be desirable to use a physical memory that is close to the second processor, while the virtual memory address that the virtual machine sees may not change. In a non-uniform memory access (NUMA) system, if multiple processes are running on a set of nodes, the termination of one process may lead to a memory imbalance that may require the moving of some memory from one node to another node to restore an optimal memory distribution and to minimize latencies. If a process is moved from one node to another node, accesses to many of the memory pages by the moved process may become off-node accesses. Migrating the memory pages used by the process to the new node may restore the performance of the process to what it was before the move of the process. However, memory page migration may be resource intensive, and may require the suspension of the current process.

To ensure that the data in the destination physical memory is the same as the data in the source physical memory after the memory page migration, the operating system that manages the source physical memory or a virtual machine that uses the source physical memory may be suspended before the data is copied. The data is then copied from the source physical memory to the destination physical memory. The operating system or the virtual machine will resume only after the copying is complete and the associated page table is updated. Thus, there may be significant downtime associated with memory page migration, during which the system may not respond to any external request or execute any user application.

Techniques disclosed herein enable migrating data in a source memory range of a source memory to a destination memory while the source memory continues to accept write operations to the source memory range. As illustrated by FIG. 1, computing system 100 may include a memory migration controller 140 between memory controller 120 and processing unit 110 (and cache 118). In various implementations, memory migration controller 140 may be located anywhere on a path from processing unit 110 to a memory, for example, integrated with processing unit 110, integrated with the memory controller 120, or anywhere between processing unit 110 and main memory 130 as an integrated or a stand-alone device. Memory migration controller 140 may be used to control the migration of data from one memory range on a source memory to a destination memory, where the memory range may be independent of the memory page of an operating system or a virtual machine. For example, the memory range may include a memory page, multiple memory pages, or a portion of a memory page of the operating system or virtual machine. The memory range may be non-contiguous on a physical memory, such as a DRAM, or may be on multiple physical memory devices, such as DRAMs.

In one specific implementation, once a decision to migrate data in a source memory page of a source memory (e.g., local DRAM of a faraway NUMA node) to a destination memory (e.g., local DRAM of a nearby NUMA node) is made, a request to move data in the source memory page of the source memory to the destination memory may be created and submitted to a memory migration controller, which may instruct, for example, a memory controller of the source memory or a DMA controller to copy data in the source memory page of the source memory to the destination memory. The DMA controller may be a DMA controller at the source memory, a DMA controller at the destination memory, or a DMA controller inside a server in a server fabric. The DMA controller may control the copying of the data in the source memory page of the source memory to the destination memory. During the time when the data in the source memory page of the source memory is being copied by the DMA controller, there may be additional write operations taking place in the source memory page of the source memory. The additional write operations may be tracked by, for example, memory migration controller 140. If a write operation takes place in a portion of the source memory page that has been accessed and copied to the destination memory by the DMA controller at least once, data associated with the write operation may be copied to the destination memory. If a write operation takes place in a portion of the source memory page that has not been accessed and copied to the destination memory by the DMA controller, the write operation may not be tracked or data associated with the write operation may not be copied to the destination memory.

After, for example, all portions of the source memory page to be copied have been copied by the DMA controller, the operating system, virtual machine, or process that accesses the source memory page may be paused or suspended. At this moment, there may still be data in a cache memory that needs to be flushed and written to the source memory page in the source memory. Such write operations may be tracked at the source memory and reflected to the destination memory by memory migration controller 140. After the cache flush is done, the tracking and the reflection may be stopped, and an associated page table may be updated to enforce the switch over from the source memory to the destination memory. After the page table is updated, the paused operating system, virtual machine, or process may resume and may access the destination memory using the updated page table.

Embodiments disclosed herein may be implemented using various techniques in various systems. Embodiments described below are merely examples and are not intended to be limiting. One of ordinary skill in the art would recognize many possible variations, alternatives, and modifications.

Figure 2:
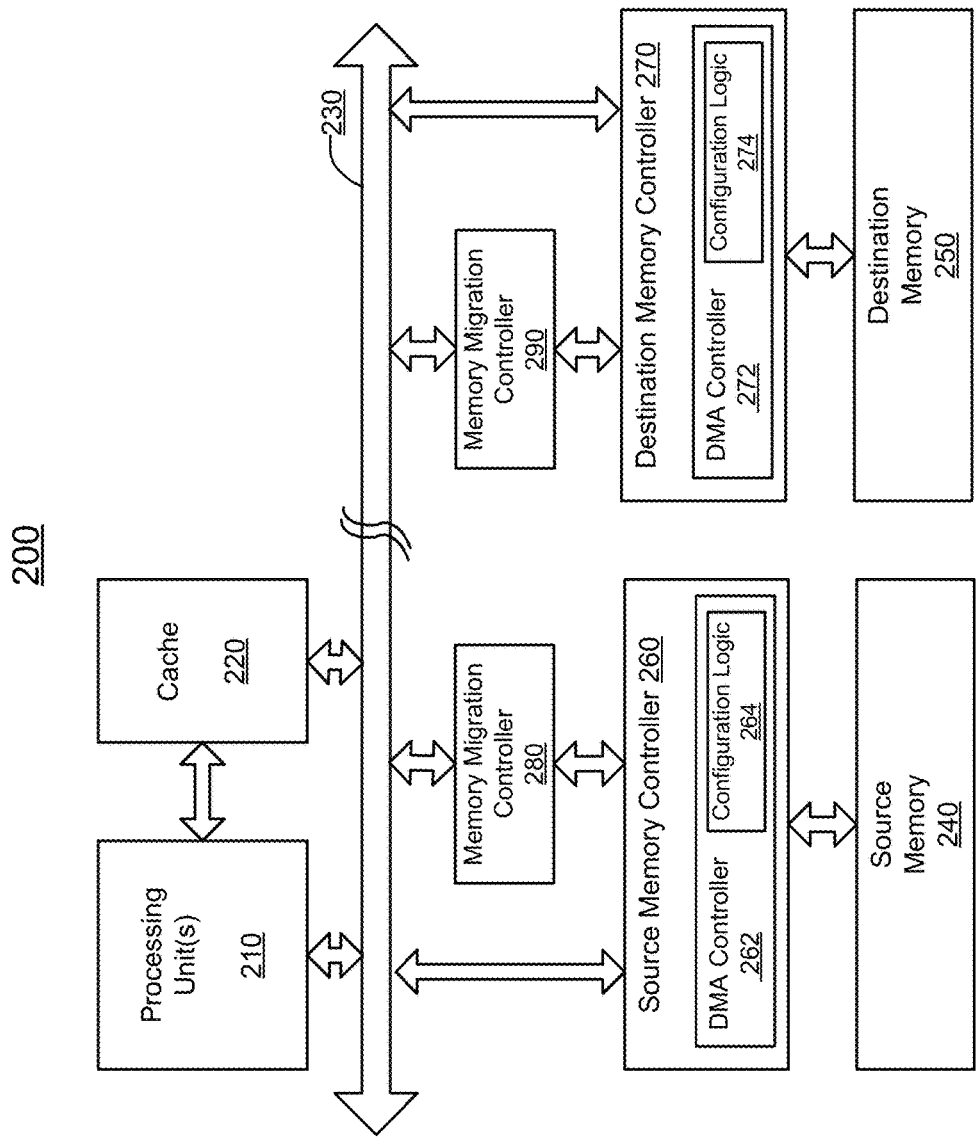
FIG. 2 is a simplified block diagram of an example computing system that can facilitate memory page migration, according to some aspects of the present disclosure.

FIG. 2 is a simplified block diagram of an example computing system 200 that can facilitate memory page migration, according to some aspects of the present disclosure. In FIG. 2, one or more processing unit(s) 210 may be communicatively coupled to a bus 230. Processing unit(s) 210 may also be communicatively coupled to a cache 220, which may also be coupled to bus 230. One or more memory subsystems, such as a source memory 240 and a destination memory 250, may be coupled to bus 230 through, for example, a source memory controller 260 and a destination memory controller 270, respectively. Data may be write to or read from source memory 240 or destination memory 250 by processing unit(s) 210 and cache 220 using source memory controller 260 or destination memory controller 270. At least one of source memory controller 260 or destination memory controller 270 may include or be coupled to a DMA controller, for example, DMA controller 262 or DMA controller 272. Computing system 200 may also include a memory migration controller 280 communicatively coupled to processing unit(s) 210, source memory controller 260 and/or destination memory controller 270, and/or at least one DMA controller (e.g., DMA controller 262, DMA controller 272, or a stand-alone DMA controller). In some embodiments, a memory migration controller 290 may be used to control the data migration at destination memory controller 270.

When a decision to migrate a source memory page in source memory 240 to destination memory 250 is made for various reasons such as the ones described above, a request to move data in the source memory page of source memory 240 to destination memory 250 may be created by, for example, processing unit(s) 210, and submitted to memory migration controller 280. A destination memory page in destination memory 250 may be allocated for receiving the data from the source memory page in source memory 240. Upon receiving the request to move the data in the source memory page in source memory 240 to destination memory 250 and the information regarding the allocated destination memory page in destination memory 250, memory migration controller 280 may initiate the copying of the data from the source memory page of source memory 240 to the destination memory page of destination memory 250 using, for example, DMA controller 262.

DMA controller 262 may copy data in the source memory page in source memory 240 to the destination memory page in destination memory 250, for example, one block at a time. In some examples, DMA controller 262 may copy the data in the source memory page, for example, 16 lines at a time, 100 lines at a time, 1 K lines at a time, 4 K lines at a time, 8 K lines at a time, or 16 K lines at a time, or more. In some examples, DMA controller 262 may copy the data in the source memory page 1 K bytes at a time, 4 K bytes at a time, 8 K bytes at a time, or 16 K bytes at a time, or more. In some examples, DMA controller 262 may copy the data in the source memory page in blocks, with a nonlinear increase in block size, such as 1 K, 4 K, 16 K, and 64 K lines or bytes in consecutive blocks. In various embodiments, the block size and/or memory address resolution of the copying by DMA controller 262 may depend on the characteristics of the source memory and/or the destination memory, such as the type, size, and speed of the source memory or the destination memory.

DMA controller 262 may copy data in the source memory page of source memory 240 to the destination memory page at a reconfigurable quality of service (QoS) including, for example, bandwidth, speed, or priority. Because data in the source memory page in source memory 240 is being copied while other data may still be written to the source memory page by, for example, processing unit(s) 210, cache 220, or other subsystems, in order to reduce the effect of the "background" memory page migration on the normal functioning of the source memory, the bandwidth of the memory used by the memory page migration may need to be limited. For example, DMA controller 262 may be configured to copy data in the source memory page in source memory 240 to the destination memory page at a fraction of the bandwidth of source memory 240, such as about 5% or less, about 10% or less, about 20% or less, about 25% or less, or about 50% or less of the full bandwidth of source memory 240. In this way, the memory page migration may not occupy a large portion of the available bandwidth of the source and/or destination memory, and source memory 240 can still be accessed by processing unit(s) 210, cache 220, or other subsystems at a desired speed. In some embodiments, data in some memory pages or memory ranges associated with certain processes or virtual machines may have a higher priority over data in other memory pages or memory ranges. DMA controller 262 may be configured to copy data based on the priority associated with the data.

The resolution, block size, bandwidth or speed of the data copying by DMA controller 262, and other settings of DMA controller 262 may be configured through, for example, a configuration logic 264, which may include multiple registers that can be set as desired. In computing system 200 of FIG. 2, DMA controller 262 is located in source memory controller 260. In some embodiments, DMA controller 262 may be separate from source memory controller 260. In some embodiments, DMA controller 272 in destination memory controller 270 may be used for copying data from source memory 240 to destination memory 250, where the settings of DMA controller 272 may be configured through a configuration logic 274 as described above with respect to DMA controller 262 and configuration logic 264.

When data in the source memory page in source memory 240 is being copied to the destination memory page, other data may still be written into the source memory page. Such write operations may be tracked and recorded by memory migration controller 280, and reflected to the destination memory later.

When the copying and reflection are done, memory migration controller 280 may request processing unit(s) 210 to suspend the current process that accesses the source memory page and flush cache 220, during which write operations to the source memory page may be tracked and reflected to the destination memory. After the cache flush, memory migration controller 280 may stop tracking write operations and request a page table update. When the page table is updated, the suspended process may resume and the updated page table may be used for future processing.

Figure 3:
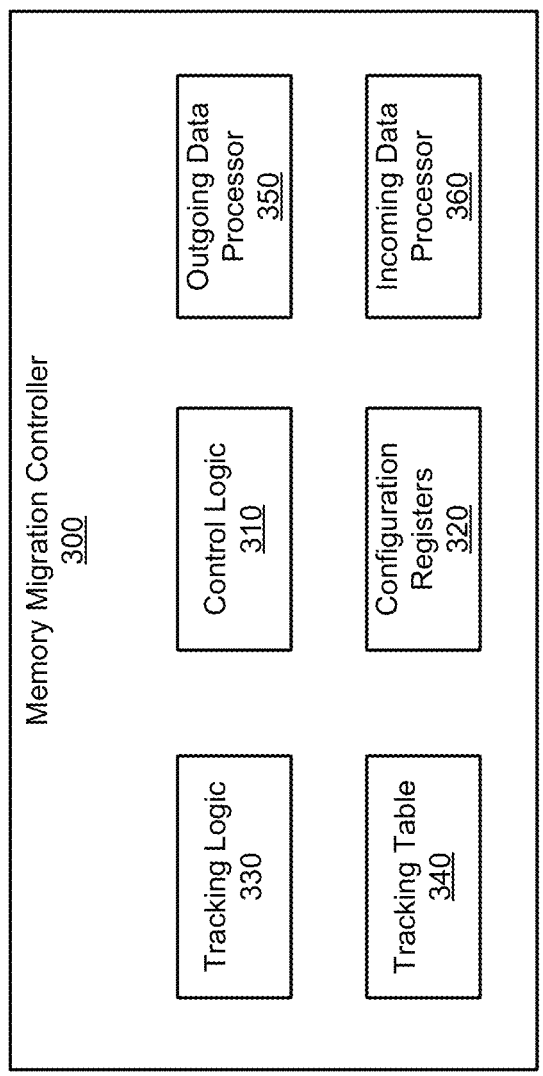
FIG. 3 is a simplified block diagram of an example memory migration controller, according to some aspects of the present disclosure.

FIG. 3 is a simplified block diagram of an example memory migration controller 300, according to some aspects of the present disclosure. Memory migration controller 300 may be an example implementation of memory migration controller 280 of FIG. 2. Memory migration controller 300 may include a control logic 310 that is communicatively coupled to processing unit(s) (e.g., processing unit(s) 210 of FIG. 2) and memory controllers of the source and/or destination memory (e.g., source memory controller 260 and destination memory controller 270), and/or at least one DMA controller (e.g., DMA controller 262, DMA controller 272, or a stand-alone DMA controller). Control logic 310 may control various functional blocks of the memory migration controller 300 through configuration registers 320.

Control logic 310 may receive instructions from the processing unit(s) for memory migration from a source memory range in the source memory to a destination memory, initiate copying data from the source memory range in the source memory to the destination memory by the DMA controller, control a tracking logic 330 for tracking write operations performed to the source memory range in the source memory, and control an outgoing data processor 350 and/or an incoming data processor 360 to, for example, compress data before sending the data onto a bus (e.g., bus 230 of FIG. 2), decompress data upon receiving compressed data, or adding attributes to the data before sending the data onto a bus. Control logic 310 may also provide the memory migration status to the processing unit(s), for example, to indicate that the full source memory has been copied and that a cache flush or invalidation and a page table update may be performed to conclude the memory migration.

In various implementations, attributes added to the data by outgoing data processor 350 before the data is sent onto the bus may include, for example, whether a cache snooping is to be performed for the data, the quality of service (QoS) of the data, or whether the data is compressed data. Cache snooping is a protocol for maintaining cache coherency in multiprocessing environments. In a snooping system, all caches on the bus may monitor (or snoop) the bus to determine if they have a copy of the block of data that is requested on the bus. For memory migration, cache snooping may not be needed, and thus an attribute indicating that no cache snooping is to be performed may be added to the data such that caches may not monitor or snoop the corresponding data. In some embodiments, separate bus may be used for memory migration. In such cases, data on the separate bus may not be seen by the caches, and thus no attribute indicating whether cache snooping is to be performed on the data may be added to the data. The QoS of the data may include, for example, the bandwidth allocated for the data and/or the priority of the data. The priority of the data may indicate the priority of the data over with other data on the bus, including data associated with other concurrent memory migration. Data with a higher priority may be delivered earlier or occupy a higher bandwidth than data with a lower priority. In some implementations, to reduce the bandwidth used by the memory migration, data from the source memory may be compressed before being sent onto the bus. Outgoing data processor 350 may compress the data and add an attribute to the data indicating that the data is compressed data. When the compressed data is received at the destination memory, incoming data processor 360 may decompress data having an attribute indicating that the data is compressed data.

Tracking logic 330 may track write operations performed to the source memory range in the source memory. Tracking logic 330 may track write operations performed to multiple source memory ranges that are being migrated concurrently. Tracking logic 330 may store the tracked write operations for various source memory ranges in a tracking table 340, where a list of write operations may be maintained for each source memory range according to the order in which the write operations are performed in each source memory range. Further details of tracking logic 330 are described with respect to, but are not limited to, specific example embodiments described below.

Figure 4:
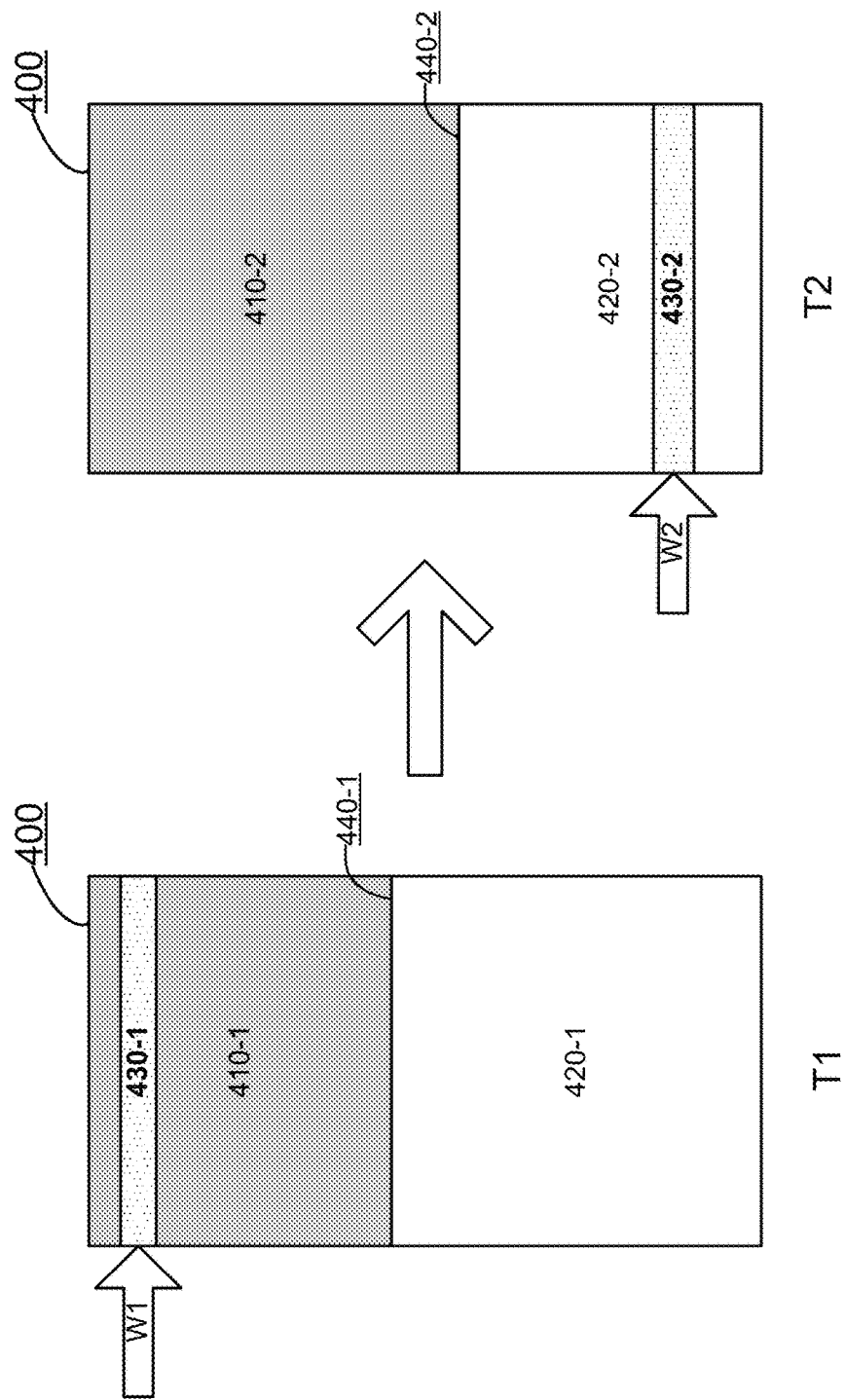
FIG. 4 illustrates example write operations performed to a source memory page that is being migrated, according to some aspects of the present disclosure.

FIG. 4 illustrates example write operations performed to a source memory page 400 of a source memory that is being migrated to a destination memory, according to some aspects of the present disclosure. At time T1, a memory space 410-1 of source memory page 400 may have been accessed by the DMA controller for migrating to the destination memory, while a memory space 420-1 of source memory page 400 has not been accessed by the DMA controller for migrating to the destination memory yet. The address of the last block of data that has been copied to the destination memory through DMA controller at time T1 may be indicated by line 440-1. As shown in FIG. 4, at time T1, data is also being written into memory space 430-1 of source memory page 400 in a write operation W1, where memory space 430-1 is a part of memory space 410-1 that has already been copied by the DMA controller. Thus, at time T1, the content of memory space 430-1 of source memory page 400 may be different from the content of corresponding memory space in the allocated destination memory page in the destination memory. Therefore, additional operations (copying) may need to be performed to make the content of corresponding memory space in the allocated destination memory page the same as the content of memory space 430-1.

As the data migration process proceeds, data in a larger memory space in source memory page 400 may have been accessed by the DMA controller for migrating to the allocated destination memory page. For example, as shown in FIG. 4, at time T2, memory space 410-2 of source memory page 400 may have been accessed by the DMA controller for migrating to the destination memory page, while memory space 420-2 of source memory page 400 has not been accessed by the DMA controller for migrating to the destination memory page yet. The address of the last block of data that has been accessed by the DMA controller for migrating to the destination memory page at time T2 may be indicated by line 440-2. As shown in FIG. 4, at time T2, data is also being written into memory space 430-2 of source memory page 400 in a write operation W2, where memory space 430-2 is a part of memory space 420-2 that has not been accessed by the DMA controller for migrating to the destination memory page.

These write operations may be monitored and tracked by, for example, memory migration controller 280 or 300, and more specifically, tracking logic 330. Memory migration controller 300 may include configuration registers 320 for configuring tracking logic 330. In some implementations, tracking logic 330 may keep a record of all write operations performed to source memory page 400 during the migration of source memory page 400, including write operations W1 and W2. Tracking logic 330 may also record the order of the write operations performed to source memory page 400 during the memory page migration. The recorded write operations may be reflected to the destination memory by, for example, a memory controller at the source memory or the destination memory, in the order of the write operations that have been recorded.

In some implementations, tracking logic 330 may only keep a record of write operations performed to a memory space of source memory page 400 after the memory space has been accessed by the DMA controller at least once during the memory page migration, such as write operation W1, but not write operation W2. Tracking logic 330 may also record the order of the write operations performed to source memory page 400 during the memory page migration. Data associated with the recorded write operations, such as write operation W1, may then be copied to the destination memory by a memory controller (or a DMA controller) at the source memory or the destination memory, in the order of the write operations that have been recorded.

Because write operation W2 is performed to a memory space of source memory page 400 before the memory space has been accessed by the DMA controller during the memory page migration, data written into source memory page 400 in write operation W2 may be copied later to the destination memory when memory space 430-2 is accessed by the DMA controller for copying to the destination memory, or may be overwritten later by other write operations before memory space 430-2 is being copied to the destination memory. Thus, write operation W2 may not need to be recorded and reflected to the destination memory page. In this way, unnecessary data transportation may be avoided and less bandwidth may be used by the memory page migration.

There may be various ways to differentiate write operation W1 from write operation W2 during the write operation tracking. For example, a progress of the copying by the DMA controller may be monitored and the address of the last copied block (indicated by line 440) may be tracked. In some examples, the progress of the copying by the DMA controller (and line 440) may be estimated based on, for example, the block size and/or the bandwidth or speed of the copying by the DMA controller as described above. For example, line 440 may be estimated to move, for example, about 100 lines every microsecond. The range of the memory space that is being written may be compared with the tracked address of the last copied block (line 440) to determine whether the write operation is performed to a memory space that has been copied by the DMA controller at least once.

After the write operations, such as write operation W1, are tracked by, for example, tracking logic 330, memory migration controller 300, and more specifically, control logic 310, may initiate the copying of the data associated with the tracked write operations to the destination memory page by, for example, the DMA controller. In some embodiments, memory migration controller 300 may initiate the copying of the data associated with the tracked write operations after each write operation is tracked. In some embodiments, memory migration controller 300 may initiate the copying of the data associated with the tracked write operations after multiple write operations are tracked and recorded. In some embodiments, memory migration controller 300 may initiate the copying of the data associated with the tracked write operations after the full source memory page to be copied has been accessed and copied by the DMA controller at least once. As described above, memory migration controller 300 may record the order of the write operations performed to the source memory page during the memory page migration, and may copy data associated with the tracked write operations to the destination memory, in the order of the write operations that has been recorded.

After all data in source memory page 400 has been accessed and copied by the DMA controller to the destination memory page, a page table pointing a virtual memory to the source memory page may need to be updated to enforce the switch from the source memory page to the destination memory page, such that future accesses to the virtual memory may access the destination memory page based on the mapping between the virtual memory and the destination memory page in the page table.

Before the page table is updated, processes that access the virtual memory that points to the source memory page may need to be paused or stopped such that no data access to the virtual memory may be performed before the page table update is complete, because it may be uncertain whether the virtual memory is pointed to the source memory page or the destination memory page when the page table is being updated.

When a process that accesses the source memory page is paused or stopped, data may continue to be written into source memory page, and the write operations to the source memory page may still need to be tracked and reflected to the destination memory page.

Referring back to FIG. 2, as described above, when data is being migrated from source memory 240 to destination memory 250, processing unit(s) 210 continues to operate, and may read data from or write data to source memory 240 through cache 220. Depending on the structure of cache 220, at any given time, some data to be written into source memory 240 may not have been written into source memory 240 and may remain in cache 220.

In some examples, cache 220 associated with the source memory range may be configured as a write-back cache. Data may be written into cache 220 every time a change occurs, but may be written into the corresponding location in the source memory range, only at specified intervals or under certain conditions. Thus, after a process that accesses the source memory page is paused or suspended, data that is intended to be written into source memory 240 but has not been written into source memory 240 may now be written into source memory 240. This process may generally be referred to as a cache flush. During the cache flush, write operations to the source memory page may still need to be tracked and reflected to the destination memory page, in a way similar to the way the tracking and reflection are done before the process is paused and the cache is flushed.

In some examples, cache 220 associated with the source memory range may be configured as a write-through cache. Data may be written into cache 220 and the corresponding source memory range at the same time. The cached data allows for fast retrieval on demand, while the same data in main memory ensures that data may not be lost if any system disruption occurs. In these examples, after a process is paused or suspended, data in cache 220 may need to be invalidated by, for example, marking cache lines as invalid such that future reads will not result in a hit for the marked line and will go to the main memory, before the process is resumed or a new process is started.

In some embodiments, cache 220 may be forced to flush by, for example, processing unit(s) 210, periodically or on-demand, while data in the source memory page is being migrated to the destination memory page. In such cases, memory controller 260 may track write operations from cache 220 to source memory 240 as any other write operations performed during memory page migration described above with respect to, for example, FIG. 4, and copy data associated with the write operations to the destination memory page.

After cache 220 is either flushed or invalidated, the tracking and reflection may be stopped, and an associated page table may be updated to enforce the switch from the source memory to the destination memory. In some embodiments, an aggregation job status may be provided to a processing unit, which may then update the page table to enforce the switch.

In some embodiments, while the page table is being updated, the source memory controller may continue to reflect write operations, if any, to the destination memory. For example, in some embodiments, the cache flush and page table update may be performed in parallel. After the page table update is done, the source memory controller may stop reflecting write operations to the destination memory, and the paused process may resume and may access the destination memory using the updated page table.

When a memory page is migrated from a source memory page to a destination memory page, references to the source memory page by multiple processes may need to be tracked, and page tables for all the processes that use the source memory page before the memory page migration may need to be updated to point to the new page in the destination memory.

It is note that although a source memory page is used as an example of a source memory range in the above examples, the source memory range may be independent of a source memory page in various implementations. For example, in some implementations, the source memory range may be a memory page of a hypervisor or virtual machine, which may include non-contiguous memory partitions in one or more physical memory devices (e.g., DRAMs). For example, a memory page of a hypervisor or virtual machine may include 4 Kbytes comprising 4 1-Kbyte partitions, where the first and third 1-Kbyte partitions may be located on a first DRAM device or controlled by a first memory controller, and the second and fourth 1-Kbyte partitions may be on a second DRAM device or controlled by a second memory controller. In some implementations, the source memory range may include only a portion of a memory page, for example, a 1-Kbyte partition of a 4-Kbyte memory page. In other words, the window for write operation tracking and reflection (i.e., the source memory range) may have a granularity less than the size of a memory page. In some embodiments, the source memory range may include more than one memory page.

The systems depicted in FIGS. 2 and 3 and described above may also enable multiple concurrent memory page migrations, where a memory migration controller (e.g., memory migration controller 280 or 300) may be configured to track write operations to multiple source memory ranges concurrently, and a DMA controller (e.g., DMA controller 262) may be configured to control data copying from multiple source memory ranges concurrently. The memory migration controller may receive, at the same time, requests to copy data from two source memory ranges of the source memory to two destination memory ranges of the destination memory, or receive a request to copy data from one source memory range when the memory migration controller is performing memory page migration for another source memory range. The DMA controller may copy data from the two source memory ranges to the two destination memory ranges concurrently while the source memory continues to accept write operations to the two source memory ranges. The memory migration controller may concurrently track write operations performed to the corresponding source memory ranges, and concurrently copy, to the two destination memory ranges data associated with the tracked write operations performed to the two source memory ranges. In various embodiments, the number of concurrent memory page migrations may depend on the number of memory ranges (address windows) that the memory migration controller can track concurrently. The list of write operations performed to each memory range may be stored in a tracking table (e.g., tracking table 340 of FIG. 3) according to the order in which the write operations are performed to each memory range. Data associated with the write operations in the list for each memory range may then be copied to the corresponding destination memory range in the same order.

In the example shown in FIG. 2, the DMA controller for the memory migration may be located in the source memory controller such that the DMA controller may have a coherent view of what is being written into the source memory during memory page migration. In some embodiments, the DMA controller for the memory migration may be located near or in the destination memory controller. In some other implementations, the DMA controller for the memory page migration may be located on a server inside of a server fabric. For example, in some embodiments, one or more processing units and caches may be communicatively coupled to a coherent bus such that a device on the bus may have a coherent view of what is being read from or written to other devices on the bus. The bus may be a network bus that connects network devices, such as servers and network memory storage devices, at different physical locations or sites. One or more memory subsystems, such as a source memory and a destination memory, may be coupled to the bus through their corresponding memory controllers. A separate DMA controller may be coupled to the bus. The source memory, destination memory, and DMA controller may be located at different physical sites or physical machines. For example, the DMA controller may be located on a server in a server fabric remote to either the source memory or the destination memory. The DMA controller may perform similar functions as DMA controller 262 of FIG. 2, and may include a configuration logic, through which the operations of the DMA controller may be configured as described above with respect to DMA controller 262 and configuration logic 264 of FIG. 2.

Figure 5:
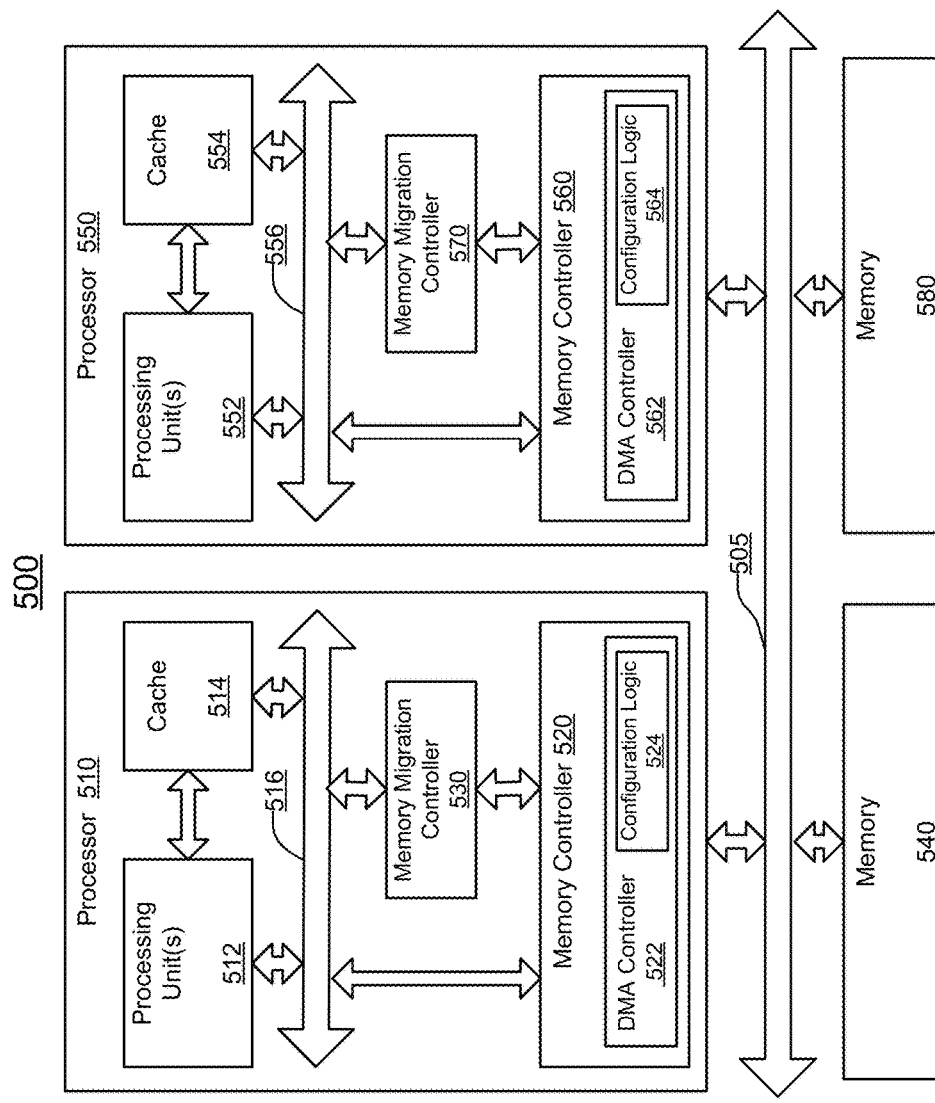
FIG. 5 is a simplified block diagram of another example computing system that can facilitate memory page migration, according to some aspects of the present disclosure.

FIG. 5 is a simplified block diagram of another example computing system 500 that can facilitate memory page migration, according to some aspects of the present disclosure. As described above, a memory migration controller may be located anywhere on a path from a processing unit to a memory, such as integrated with the processing unit, in the memory controller of the memory, or between the processing unit and the memory as a stand-alone device. In computing system 200, memory migration controller 280 is shown as a device between processing unit(2) 210 (and cache 220) and source memory controller 260 (and source memory 240). In computing system 500, memory migration controllers are shown as integrated with processing units and memory controller in a single processor device.

Computing system 500 may include one or more processors, such as processors 510 and 550. Processor 510 may include one or more processing unit(s) 512 and associated cache 514, which may include, for example, a Level 1 instruction cache, a Level 1 data cache, a Level 2 cache, and/or a Level 3 cache, as described above with respect to FIG. 1. Processor 510 may include an internal bus 516 for communication between various components in processor 510. A memory controller 520 may be communicatively coupled to processing unit(s) 512 and cache 514 through, for example, internal bus 516. Memory controller 520 may include a DMA controller 522, which may include a configuration logic 524, as described above with respect to FIG. 2. Processor 510 may also include a memory migration controller 530 located between processing unit(s) 512 (and cache 514) and memory controller 520 for controlling data migration between a memory 540 and a memory 580 using a system bus 505. Memory migration controller 530 may include a memory migration controller as described above with respect to FIG. 3.

Similarly, processor 550 may include one or more processing unit(s) 552 and associated cache 554, which may include, for example, a Level 1 instruction cache, a Level 1 data cache, a Level 2 cache, and/or a Level 3 cache, as described above with respect to FIG. 1. Processor 550 may include an internal bus 556 for communication between various components in processor 550. A memory controller 560 may be communicatively coupled to processing unit(s) 552 and cache 554 through, for example, internal bus 556. Memory controller 560 may include a DMA controller 562, which may include a configuration logic 564, as described above with respect to FIG. 2. Processor 550 may also include a memory migration controller 570 located between processing unit(s) 552 (and cache 554) and memory controller 560 for controlling data migration between memory 540 and memory 580. Memory migration controller 570 may include a memory migration controller as described above with respect to FIG. 3.

In various embodiments, the computing system, the memory controller, and the DMA controller described in the present disclosure may be implemented as one of an application-specific integrated circuit (ASIC), a field-programmable gate array (FPGA), a system-on-chip (SoC), a system-in-package (SiP), and a portion of an ASIC, FPGA, SoC, or SiP.

Techniques described herein may be used for memory page migration across NUMA nodes. Techniques described herein may also be used for memory page migration across same or different classes of memory, such as, for example, high bandwidth memory (HBM), dynamic random-access memory (DRAM), and storage class memory (e.g., hard disk). For example, techniques described herein may be used to migrate a memory page from an HBM to a DRAM, from a DRAM to a storage class memory, from a DRAM to an HBM, or from a storage class memory to a DRAM.

In one specific example, techniques disclosed herein may be used to create checkpoints for high performance computing (HPC). In HPC, a computation process may run on a machine for days or even weeks. Data created during the computation process, such as intermediate results, may be saved periodically as checkpoints. If a system failure occurs, these saved intermediate results may be used when the computation process resumes, and the computation process does not need to start from the beginning. The checkpoints may be created using techniques described herein to copy data, for example, from a cache or DRAM to a persistent memory, such as a storage class memory (e.g., a hard disk).

In embodiments where data in the destination memory may not need to be used any time soon, such as HPC checkpoints, data in the destination memory may be compressed to save memory space.

Figure 6:
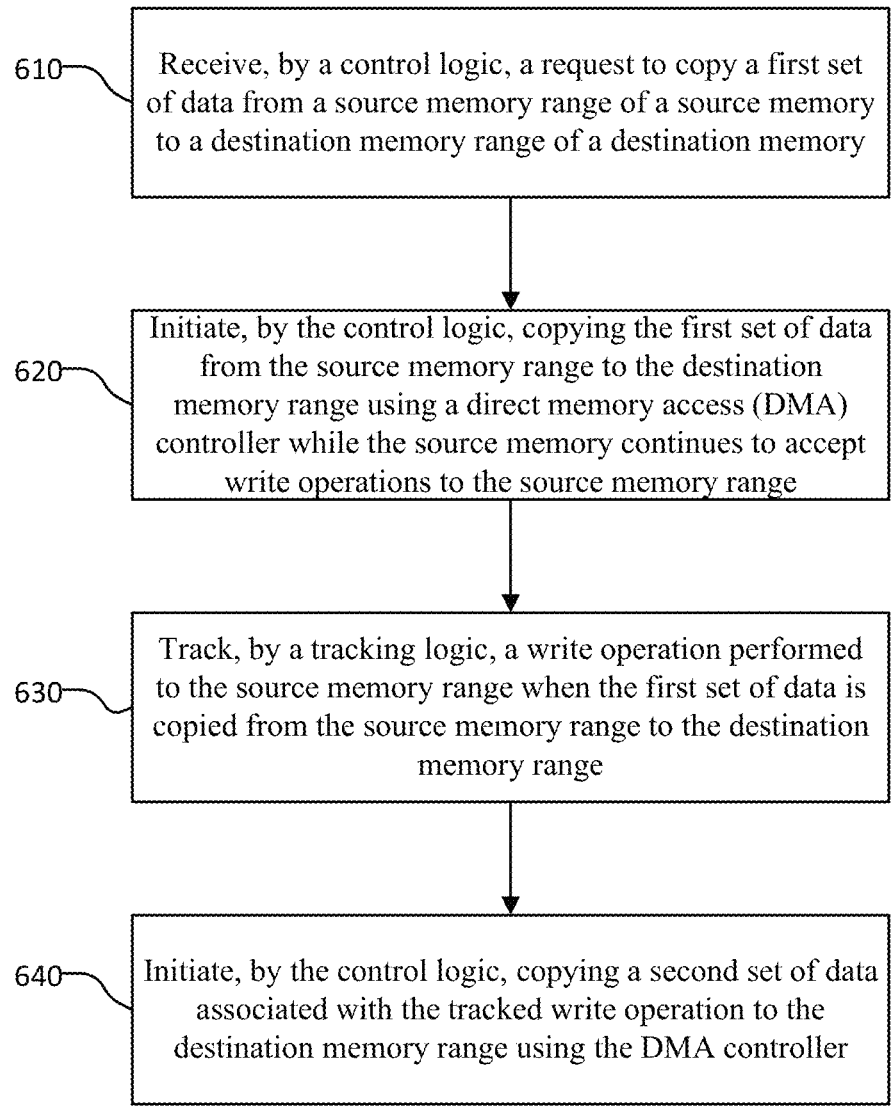
FIG. 6 is a flow chart illustrating an example computer-implemented method for memory page migration, according to some aspects of the present disclosure.

FIG. 6 is a flow chart illustrating an example computer-implemented method for memory page migration, according to some aspects of the present disclosure. The method may be implemented by the systems described above, such as, for example, memory migration controller 140 of FIG. 1, memory migration controller 280 of FIG. 2, memory migration controller 300 of FIG. 3, or memory migration controller 530 or 570 of FIG. 5.

At block 610, a control logic of a memory migration controller, such as control logic 310 of memory migration controller 300, may receive a request, for example, from processing unit(s) 210, to copy a first set of data from a source memory range of a source memory (e.g., source memory 240) to a destination memory range of a destination memory (e.g., destination memory 250). The source memory range may include a single source memory page, a portion of a source memory page, or multiple source memory pages.

At block 620, the control logic of the memory migration controller, in response to the request at block 610, may instruct a DMA controller to start to copy the first set of data from the source memory range to the destination memory range while the source memory continues to accept write operations to the source memory range. As described above with respect to FIG. 2, the DMA controller may be configured to copy data from the source memory range at various speeds, in various block sizes and resolutions, or with different priorities, which may be configured as desired through a configuration logic, such as configuration logic 264.

At block 630, while the first set of data is being copied from the source memory range to the destination memory range, a tracking logic of the memory migration controller, such as tracking logic 330 of memory migration controller 300, may track a write operation performed to the source memory range. As discussed above with respect to FIGS. 3 and 4, in some embodiments, the tracking logic of memory migration controller may track all write operations performed to the source memory range while the first set of data is being copied from the source memory range to the destination memory range. In some other embodiments, the tracking logic of the memory migration controller may only track write operations performed to a memory space in the source memory range that has been copied at least once by the DMA controller during the memory page migration. In some embodiments, the timing order in which the write operations are performed to the source memory range may be recorded. As described above, multiple source memory ranges may be migrated and tracked concurrently, and the timing order in which the write operations are performed may be recorded for each source memory range.

At block 640, the control logic may instruct, for example, the DMA controller to copy a second set of data associated with the tracked write operation performed to the source memory range to the destination memory range. The copying of the second set of data may be performed according to the timing order recorded at block 630.

It is noted that even though FIG. 6 describes the operations in the flow chart of FIG. 6 as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed at another block. Furthermore, embodiments of the methods may be implemented by hardware, software, firmware, middleware, microcode, hardware description languages, or any combination thereof.

Figure 7:
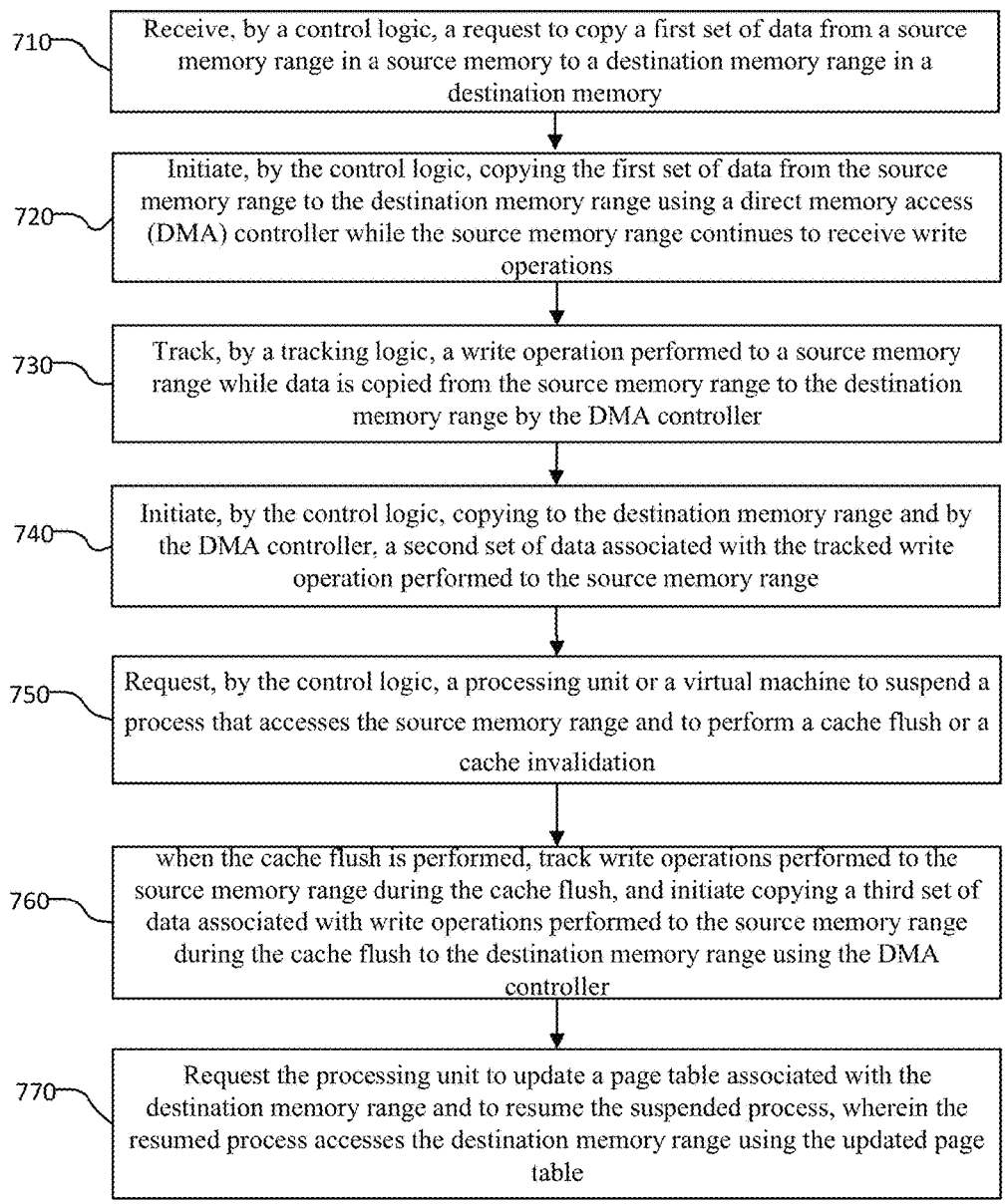
FIG. 7 is a flow chart illustrating another example method for memory page migration, according to some aspects of the present disclosure.

FIG. 7 is a flow chart illustrating another example method for memory page migration, according to some aspects of the present disclosure. The method may be implemented by the systems described above, such as, for example computing system 100 of FIG. 1, computing system 200 of FIG. 2, or computing system 500 of FIG. 5.

At block 710, a control logic of a memory migration controller, such as control logic 310 of FIG. 3, may receive a request, for example, from processing unit(s) 210 or through memory controller 260, to copy data from a source memory range of a source memory (e.g., source memory 240) to a destination memory range of a destination memory (e.g., destination memory 250). The source memory range may include a single source memory page, a portion of a source memory page, or multiple source memory pages. In some embodiments, the request may include copying data from multiple source memory ranges to corresponding destination memory ranges.

At block 720, the control logic, in response to the request at block 710, may instruct a DMA controller, such as DMA controller 262, to start copying data from the source memory range to the destination memory range while the source memory continues to accept write operations to the source memory range. As described above with respect to FIG. 2, the DMA controller may copy data from the source memory range at various speeds or in various block sizes and resolutions, which may be configured as desired through a configuration logic, such as configuration logic 264.

At block 730, while data is being copied from the source memory range to the destination memory range by the DMA controller, a tracking logic of the memory migration controller, such as tracking logic 330 of memory migration controller 300, may track a write operation performed to the source memory range. In some implementations, the tracking logic may only track write operations to a memory space within the source memory range, where data in the memory space has been accessed and copied to the destination memory range by the DMA controller at least once before the write operation is performed, as discussed above with respect to FIG. 4. In some embodiments, the timing order that the write operations are performed may be recorded.

At block 740, the control logic may instruct, for example, the DMA controller, to copy data associated with the tracked write operation performed to the source memory range to the destination memory range. The copying of the data may be performed according to the timing order recorded at block 730.

At block 750, after the source memory range has been accessed and copied by the DMA controller at least once, the control logic may request a processing unit, such as processing unit(s) 210, to suspend a process that accesses the source memory range. The process may be suspended, and the associated states and data may be saved such that the process may resume at a later time from the point where it is suspended. There may be multiple processes that access the source memory page before or during the memory page migration. All these processes may be paused. In some embodiments, the processes that access the source memory page may be stopped. The processing unit may perform a cache flush or cache invalidation, depending on the configuration of the cache memory associated with the source memory range. If the cache memory associated with the source memory range is configured as a write-back cache, after a process that accesses the source memory page is suspended, data that is intended to be written into the source memory but has not been written into the source memory may be written into the source memory during the cache flush. During the cache flush, write operations to the source memory page may be tracked. If the cache memory associated with the source memory range is configured as a write-through cache, after a process is paused, data in the cache memory may need to be invalidated by, for example, marking cache lines as invalid such that future reads will not result in a hit for the marked line and will go to the main memory.

Optionally, at block 760, when a cache flush is performed at block 650, the tracking logic of the memory migration controller may track write operations performed to the source memory range during the cache flush, and the control logic may instruct the DMA controller to copy data associated with write operations performed to the source memory range during the cache flush to the destination memory range.

At block 770, after the copying of data in the source memory range and data associated with the write operations performed to the source memory range during the copying and/or cache flush is complete, the control logic may request the processing unit to update a page table associated with the destination memory range. In some embodiments, multiple processes may access the source memory page before or during the memory page migration, and the page table for each of the multiple processes may be updated. The paused process may then resume at the processing unit. The resumed process may now access the destination memory range, rather than the source memory range, using the updated page table.

It is noted that even though FIG. 7 describes the operations in the flow chart of FIG. 7 as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed at another block. Furthermore, embodiments of the methods may be implemented by hardware, software, firmware, middleware, microcode, hardware description languages, or any combination thereof.

Figure 8:
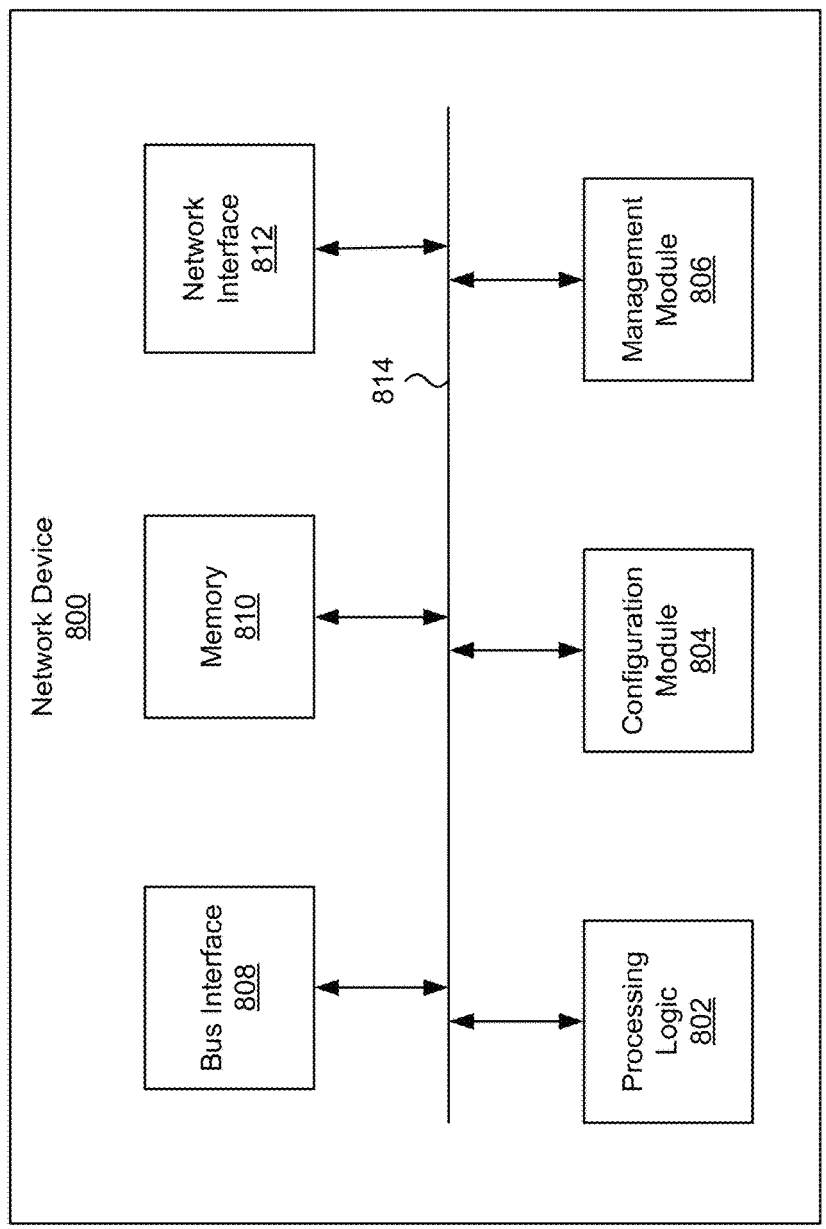
FIG. 8 illustrates an example of a network device, according to certain aspects of the present disclosure.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computing system Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
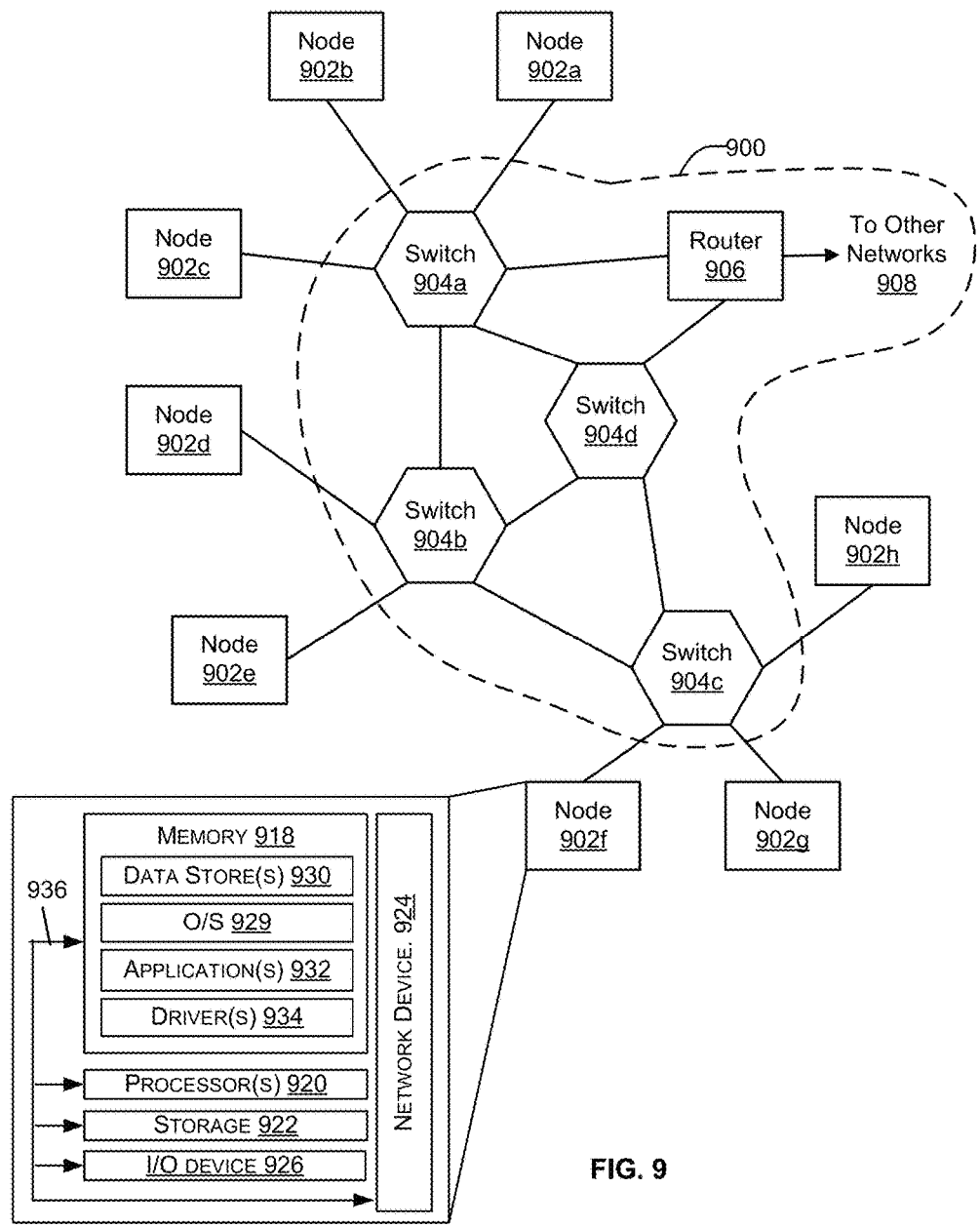
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more applications 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, applications 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between applications 932 and the operating system 928, and/or applications 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s)

900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computing systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
    receiving, by a control logic, a request to copy a first set of data from a source memory range in a source memory to a destination memory range in a destination memory;
    initiating copying the first set of data from the source memory range to the destination memory range using a direct memory access (DMA) controller while the source memory continues to accept write operations to the source memory range;
    tracking, by a tracking logic, a write operation performed to the source memory range while the first set of data is copied from the source memory range to the destination memory range by the DMA controller;
    initiating copying, to the destination memory range and by the DMA controller, a second set of data associated with the tracked write operation performed to the source memory range;
    requesting a processing unit to suspend a process that accesses the source memory range and to perform a cache flush or cache invalidation;
    when the cache flush is performed:
        tracking write operations performed to the source memory range during the cache flush; and
        initiating copying, to the destination memory range using the DMA controller, a third set of data associated with write operations performed to the source memory range during the cache flush; and
    requesting the processing unit to update a page table associated with the destination memory range and to resume the suspended process, wherein the resumed process accesses the destination memory range using the updated page table.

2. The method of claim 1, wherein initiating copying the first, second, or third set of data from the source memory range to the destination memory range includes configuring the DMA controller to copy the first, second, or third set of data from the source memory range to the destination memory range at a bandwidth that is less than a full bandwidth of the source memory or according to a priority.

3. The method of claim 1, further comprising:
    processing the first, second, or third set of data before copying the first, second, or third set of data from the source memory range to the destination memory range.

4. An apparatus for controlling memory migration, the apparatus comprising:
    a control logic circuit configured to:
        receive a request to copy a first set of data from a source memory range of a source memory to a destination memory range of a destination memory; and
        initiate copying the first set of data from the source memory range to the destination memory range using a direct memory access (DMA) controller while the source memory continues to accept write operations to the source memory range; and
    a tracking logic circuit coupled to the control logic circuit, the tracking logic circuit configured to track a write operation performed to the source memory range while the first set of data is copied from the source memory range to the destination memory range by the DMA controller.

5. The apparatus of claim 4, wherein the control logic circuit is configured to initiate copying the first set of data from the source memory range to the destination memory range using the DMA controller with a reconfigurable quality of service (QoS).

6. The apparatus of claim 4, wherein tracking the write operation performed to the source memory range includes:
    tracking a progress of the copying by the DMA controller; and
    tracking the write operation performed to a memory space within the source memory range, wherein the memory space has been accessed and copied by the DMA controller to the destination memory range.

7. The apparatus of claim 4, wherein:
    the tracking logic circuit is configured to track a time order in which write operations are performed to the source memory range; and
    the control logic circuit is configured to initiate copying, to the destination memory range and in the time order, data associated with the tracked write operations.

8. The apparatus of claim 4, wherein the control logic circuit is configured to:
    receive requests to copy data from two source memory ranges of the source memory to two destination memory ranges of the destination memory; and
    initiate copying the data from the two source memory ranges to the two destination memory ranges concurrently while the source memory continues to accept write operations to the two source memory ranges.

9. The apparatus of claim 4, wherein the control logic circuit is configured to request a processing unit to:
    suspend a process that accesses the source memory range; and
    perform a cache flush or cache invalidation on a cache memory associated with the source memory range.

10. The apparatus of claim 4, wherein the apparatus is one of an application-specific integrated circuit (ASIC), a field-programmable gate array (FPGA), a system-on-chip (SoC), a system-in-package (SiP), and a portion of an ASIC, FPGA, SoC, or SiP.

11. The apparatus of claim 4, wherein a size of the source memory range is different from a size of a memory page of an operating system or a virtual machine.

12. The apparatus of claim 4, wherein the DMA controller is inside a server, on a memory controller of the source memory, or on a memory controller of the destination memory.

13. The apparatus of claim 4, further comprising a data processor configured to add an attribute to the first set of data or compress the first set of data.

14. The apparatus of claim 4, wherein a data copying property of the DMA controller is configurable via a configuration logic in the DMA controller.

15. The apparatus of claim 4, wherein the control logic circuit is further configured to initiate copying a second set of data associated with the tracked write operation to the destination memory range using the DMA controller.

16. The apparatus of claim 5, wherein the reconfigurable QoS includes at least one of a bandwidth of the source memory used for the copying or a priority of the copying associated with the first set of data.

17. The apparatus of claim 8, wherein:
the tracking logic circuit is configured to track, concurrently, write operations performed to the two source memory ranges; and
the control logic circuit is configured to initiate copying, concurrently to the corresponding destination memory ranges, data associated with the tracked write operations performed to the two source memory ranges.

18. The apparatus of claim 9, wherein:
the cache memory associated with the source memory range is configured as a write-back cache; and
the control logic circuit is configured to request the processing unit to perform the cache flush on the cache memory.

19. The apparatus of claim 18, wherein:
the tracking logic circuit is configured to track a write operation performed to the source memory range during the cache flush; and
the control logic circuit is configured to copy, to the destination memory range and using the DMA controller, data associated with the tracked write operation performed to the source memory range during the cache flush.

20. The apparatus of claim 9, wherein:
the cache memory associated with the source memory range is configured as a write-through cache; and
the control logic circuit is configured to request the processing unit to perform the cache invalidation on the cache memory.

21. The apparatus of claim 9, wherein the control logic circuit is further configured to request the processing unit to:
update a page table associated with the destination memory range; and
resume the suspended process, wherein the resumed process accesses the destination memory range using the updated page table.

22. A computer-implemented method comprising:
receiving, by a control logic circuit, a request to copy a first set of data from a source memory range of a source memory to a destination memory range of a destination memory;
copying, via a direct memory access controller (DMA), the first set of data from the source memory range to the destination memory range while the source memory continues to accept write operations to the source memory range;
tracking, by a tracking logic circuit, a write operation performed to the source memory range when the first set of data is copied from the source memory range to the destination memory range.

23. The computer-implemented method of claim 22, further comprising:
requesting a processing unit to suspend a process that accesses the source memory range and to perform a cache flush;
copying, to the destination memory range and via the DMA controller, a second set of data associated with write operations performed to the source memory range during the cache flush; and
requesting the processing unit to update a page table associated with the destination memory range and to resume the suspended process, wherein the resumed process accesses the destination memory range using the updated page table.

\* \* \* \* \*